United States Patent
O'Brien

[15] 3,704,410
[45] Nov. 28, 1972

[54] BRIDGE CIRCUIT UTILIZING PULSE ECHO TECHNIQUE

[72] Inventor: Kevin Christopher O'Brien, Parsippany, N.J.

[73] Assignee: Bell Telephone Laboratories, Incorporated, Murray Hill, Berkeley Heights, N.J.

[22] Filed: June 29, 1971

[21] Appl. No.: 157,926

[52] U.S. Cl. ............................................... 324/58 A
[51] Int. Cl. .............................................. G01r 27/04
[58] Field of Search .............. 324/58 A, 58 R, 58.5 A

[56] References Cited

UNITED STATES PATENTS

| | | | |
|---|---|---|---|
| 2,790,143 | 4/1957 | Kyhl | 324/58 R |
| 3,257,614 | 6/1966 | Hankin et al. | 324/58 R |
| 3,399,345 | 8/1968 | Cohn | 324/58 A |
| 3,508,156 | 4/1970 | Webb | 324/58 A |
| 3,596,175 | 7/1971 | Alford | 324/58 A |

*Primary Examiner*—Stanley T. Krawczewicz
*Attorney*—R. J. Guenther et al.

[57] ABSTRACT

Sensitivity of a bridge circuit for measuring propagation characteristics of test samples is increased by employing a pulse-echo technique. The bridge includes sample and reference arms having substantially identical characteristics. Each of the bridge arms is arranged so that a single pulse signal is caused to propagate the length of each arm a plurality of times. The pulse signals are periodically sampled and compared to generate a difference signal. In turn, the difference signal is utilized to determine a characteristic of a test sample, for example, attenuation.

10 Claims, 3 Drawing Figures

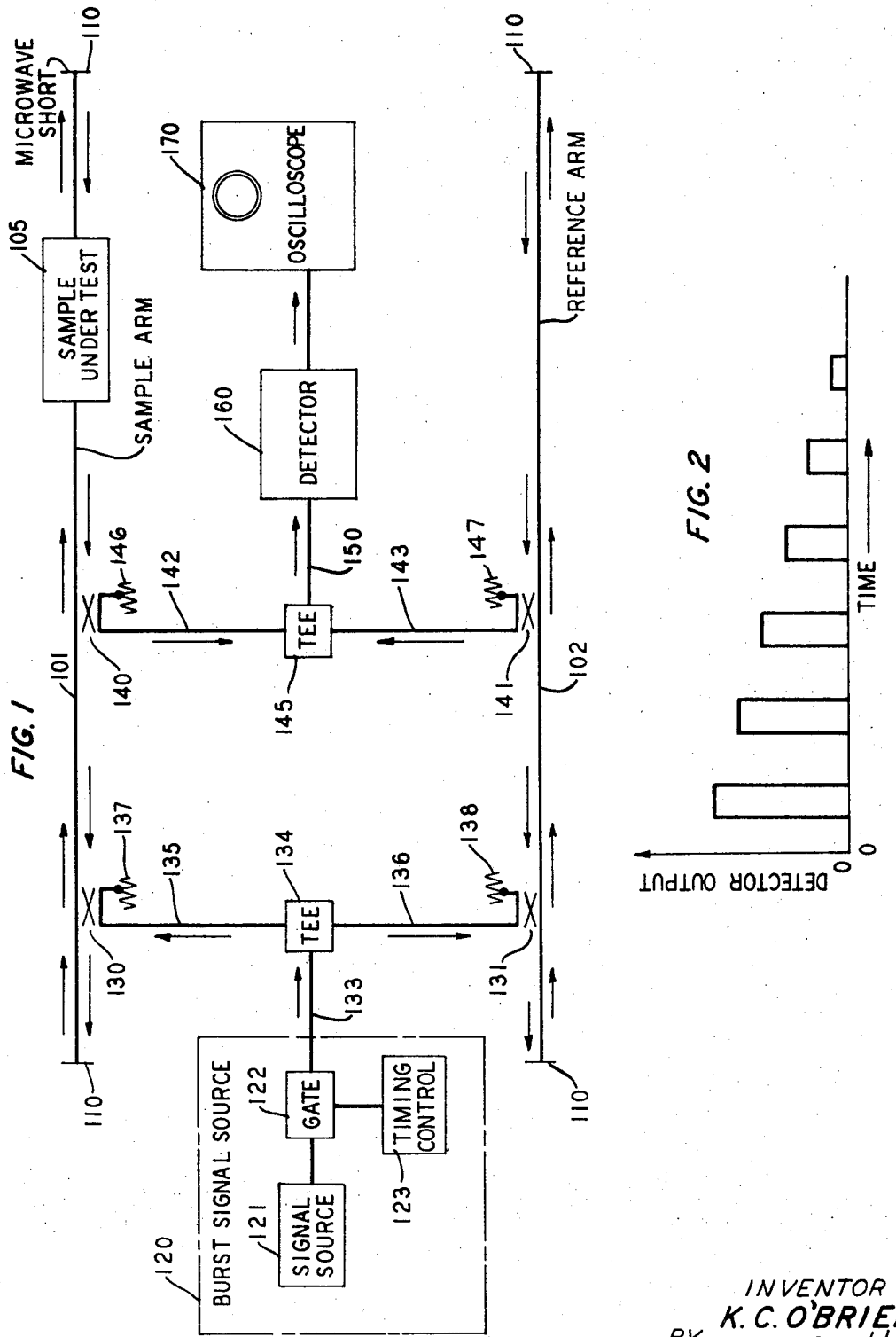

BRIDGE CIRCUIT UTILIZING PULSE ECHO TECHNIQUE

BACKGROUND OF THE INVENTION

This invention relates to measurement systems and, more particularly, to a balanced bridge system employing pulse-echo techniques.

Numerous test systems have been utilized to measure propagation characteristics of test samples. For the most part, the known systems employ bridge arrangements utilizing continuous wave techniques or resonant cavities. Although such systems are satisfactory in some applications, they are undesirable in others because of their limited sensitivity, and for those systems using resonant cavities because of their limited frequency range.

Pulse-echo techniques have been utilized primarily to locate the position of faults or other imperfections in transmission systems. A pulse echo system disclosed in U. S. Pat. No. 3,244,978 issued to G. F. Cravin et al. on Apr. 5, 1966 has been utilized to measure losses in waveguides. The Cravin et al. system, however, also suffers from limited sensitivity and, therefore, is unsatisfactory for measuring propagation properties of test samples placed in a microwave section. Indeed, it would be difficult, if at all possible, to distinguish between the affect of a low loss test sample placed in a waveguide section and the affect of the waveguide itself by utilizing the Cravin et al. system.

SUMMARY OF THE INVENTION

These and other problems are resolved, in accordance with the invention, in a balanced bridge arrangement employing pulse-echo techniques. More specifically, a bridge utilized in the practice of this invention includes a sample arm arranged to accommodate a test sample and a reference arm. The sample and reference arms are arranged to form a balanced bridge configuration. Both bridge arms have substantially identical characteristics, thereby limiting the effect of their inherent attenuation and phase characteristics from consideration in testing a sample. A test pulse at a frequency of interest and having an interval less than the "round-trip" propagation time of the sample arm, in accordance with the invention, is simultaneously weakly coupled into both the sample and reference arms of the bridge. Each of the bridge arms is terminated or otherwise arranged so that the test pulse is caused to propagate the length of each arm a plurality of times.

In one embodiment of the invention, the bridge arms are waveguide sections terminated at each end by reflecting elements, for example, waveguide shorts having a reflection coefficient of one (1). Thus, once a test pulse is introduced into each of the bridge arms, it is reflected and re-reflected to propagate the length of each arm a plurality of times and, hence, through a test sample placed in the sample arm a plurality of times. The reflected or "echo" pulses are sampled from each bridge arm and supplied to a comparator. The comparator output represents the difference in power level between the echo pulses propagating in the sample and reference arms. Therefore, the difference signal represents the affect of the test sample on the test pulse. The difference signal, in turn, is detected and the supplied to an oscilloscope or otherwise utilized as desired. In practice, the difference signal is utilized to determine a characteristic of the test sample, for example, attenuation. Greater sensitivity is attained by utilizing this invention because the test pulse passes through the sample under test a plurality of times and, hence, is attenuated a plurality of times.

BRIEF DESCRIPTION OF THE DRAWINGS

These and other objects and advantages of the invention will be more fully understood from the following detailed description of an illustrative embodiment thereof taken in connection with the appended drawings wherein:

FIG. 1 depicts in simplified form a balanced microwave bridge arrangement which may be employed in practicing the invention;

FIG. 2 shows a waveform useful in describing the operation of the bridge of FIG. 1.

DETAILED DESCRIPTION

Figure 3:
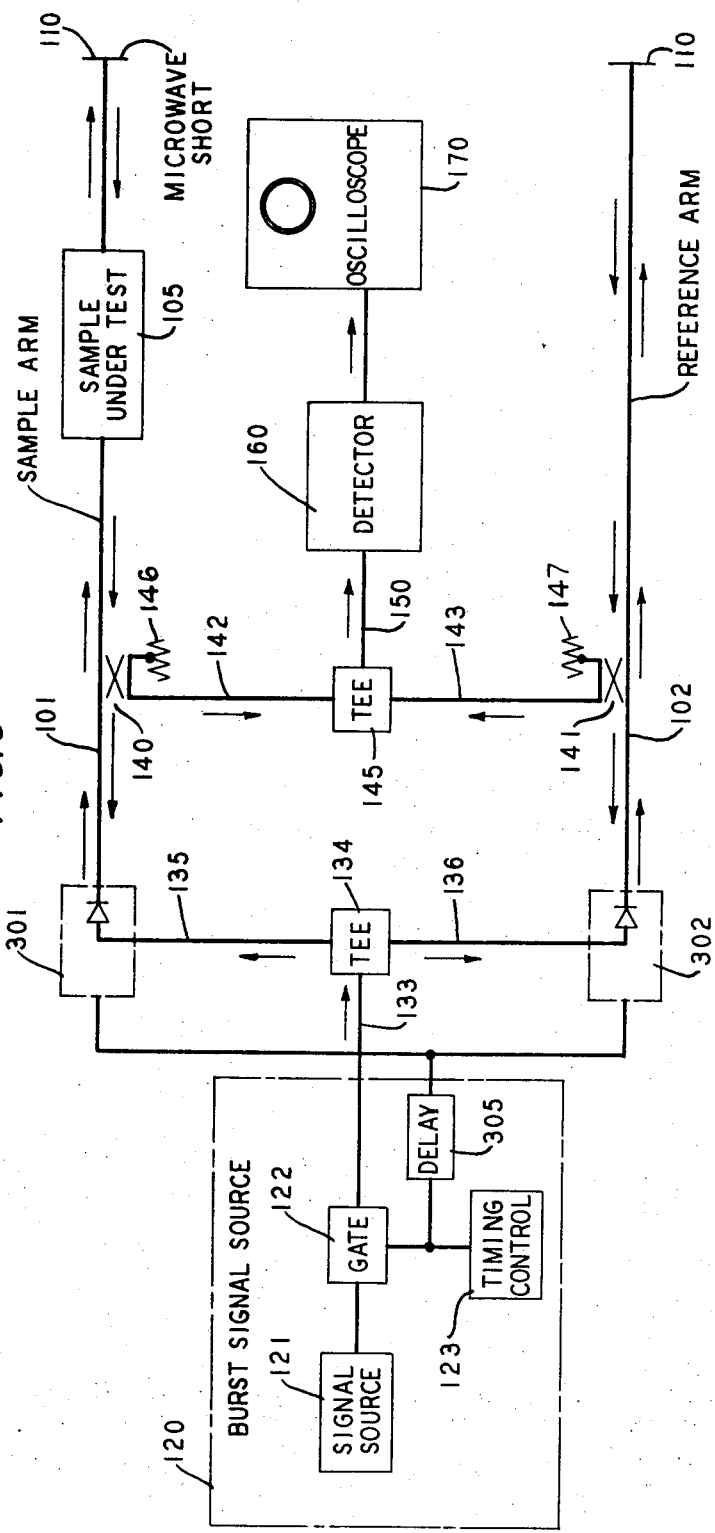
FIG. 3 illustrates in simplified form a second balanced bridge arrangement which may be utilized in practicing the invention.

The principles of this invention are equally applicable to optical and acoustical measurement systems. However, for brevity, the invention is hereafter discussed in the context of a microwave measurement system. Accordingly, FIG. 1 illustrates in simplified form a first balanced microwave bridge arrangement which is utilized in practicing the invention. Sample arm 101 and reference arm 102 are waveguide sections having substantially similar characteristics. Sample arm 101 further includes waveguide section 105 which is adapted for accommodating test samples. The test samples may include, but are not limited to gases, dielectric materials, waveguide sections and the like. Both sample arm 101 and reference arm 102 are terminated at each end by a microwave short, 110. Termination elements 110 each have a reflection coefficient of one (1). Therefore, all the energy supplied to elements 110 is reflected back.

A test signal is generated in burst signal source 120. Burst source 120 may include, for example, microwave signal source 121, gate 122 and timing control 123. Signal source 121 includes, for example, a klystron oscillator capable of generating signals in the microwave frequency range. Gate 122 may be any of the numerous microwave switching diodes known in the art, for example, a PIN diode. Timing control 122 may be a standard pulse generator of a type well known in the art. Gate 122 and timing control 123 are utilized to generate a "narrow" pulse at a microwave frequency of interest generated by source 121. The interval of the test pulse should be less than the "round-tip" signal propagation time in the sample arm. The test pulse is supplied via waveguide section 133 to microwave Tee 134 where it is divided. In turn, one component of the divided test pulse is supplied via waveguide section 135 to directional coupler 130 and a second component is supplied via waveguide section 136 to directional coupler 131. Couplers 130 and 131 which, for example, are a 10 db type well known in the art, simultaneously weakly couple the test pulse into sample arm 101 and reference arm 102, respectively. Since only a portion of the test pulse energy is coupled into arms 101 and 102, directional couplers 130 and 131 are terminated with resistor loads 137 and 138, respectively, to absorb the excess test pulse energy; thereby eliminating unwanted reflections of the test pulse in waveguide sections 133, 135 and 136.

Once the test pulse has been simultaneously supplied to sample arm 101 and reference arm 102, it is there reflected and re-reflected and a plurality of times by reflecting elements 110. Thus, the test pulse is caused to traverse the length of both bridge arms a plurality of times and, hence, propagate through a test sample placed in waveguide section 105 a plurality of times. The reflected or "echo" pulses propagating in arms 101 and 102 are sampled via directional couplers 140 and 141, respectively. Couplers 140 and 141 may also be of a 10 db type. The sampled echo pulses are supplied via waveguide sections 142 and 143 to individual ports of microwave Tee 145. Directional couplers 140 and 141 are also terminated with resistor loads 146 and 147, respectively, to absorb excess energy and minimize reflections in waveguide sections 142 and 143. As is well known in the art, the output of microwave Tee 145, at 150, represents the difference in power level of the sampled echo pulses supplied from bridge arms 101 and 102. This difference signal is supplied to microwave detector 160. Detector 160 may be any one of numerous diode type microwave detectors known in the art. Indeed, numerous other detector schemes may be employed in the practice of the invention. In turn, the output of detector 160 is supplied to oscilloscope 170 where it is displayed or otherwise utilized as desired.

It is important that the test pulse transit time is equal for signals propagating in both sample arm 101 and reference arm 102 of the microwave bridge employed in this invention. Accordingly, the length of the circuit path including waveguide 135, sample arm 101, waveguide 105 and waveguide 142 should be equal to the length of the circuit path including waveguide 136, reference arm 102 and waveguide 143. To achieve equalized transit times in these circuit paths, various phase shifters, line stretchers and attenuators (not shown) are employed in well known fashion.

The pulse echo bridge arrangement of this invention is balanced prior to measuring propagation characteristics of a test sample. Balancing of the bridge is achieved by adjusting the signal transit times for the sample and reference arms with not test sample in waveguide section 105 so that detector 160 yields a zero output. Then, placement of a test sample, for example, a gas into waveguide section 105 causes the bridge to become unbalanced and a signal is developed at the output of detector 160. An example of a possible output signal from detector 160 is shown in FIG. 2.

As stated above, the signal supplied to detector 160 represents the difference in power level between the echo pulses propagating in sample arm 101 and those propagating in reference arm 102. The echo pulse propagating in sample arm 101 passes through the test sample a plurality of times. Thus, each subsequent sample of the echo pulse in arm 101 has passed through the sample another two times and, therefore, is effectively modulated by a test sample. The pulse height of each successive echo pulse depends upon the number of the echo, $n$, the total attenuation, A, and the phase shift P, of the bridge arms absent a test sample and the attenuation, B, and phase shift, Q, of the sample. If the test sample is dispersive and/or scattering, the echo pulse shape may be altered. Usually, the attenuation and phase shift of the bridge arm are known approximately. Therefore, they may be varied independently of the attenuation and phase shift attributed to the sample-under-test and, hence, may be eliminated from consideration. Since the number of the echo pulse is known, attenuation B and phase shift Q of the sample-under-test is determined with great accuracy by measuring the amplitude and separation of successive echo pulses displayed on oscilloscope 170 (FIG. 1).

Numerous mathematical relationships known in the art may be employed to derive desired information from the displayed waveform. For an ideal sample, that is, one having no phase shift or scattering affects, the amplitude of the nth detected echo pulse is approximately given by:

$$S_n = 0.46\, n\, B/10^{n\, A/10},\ nB \ll 1$$

where B is the attenuation in db caused by the sample and A is the attenuation in db caused by the vacant sample arm.

FIG. 3 illustrates a second balanced bridge arrangement which may be employed in practicing the invention. Elements of the bridge shown in FIG. 3 which are essentially identical to those utilized in the bridge shown in FIG. 1 are similarly numbered and are not again discussed in great detail.

The bridge shown in FIG. 3 operates to supply greater power to the test sample than the bridge of FIG. 1. This increase in power is achieved by employing switching elements 301 and 302 (FIG. 3) for supplying a test pulse to sample arm 101 and reference arm 102, respectively. Switching elements 301 and 302 are, for example, standard microwave switching diodes of a type well known in the art. This arrangement eliminates the use of 10 db couplers and, hence, the associated losses in signal power.

Operation of the bridge shown in FIG. 3 in determining the propagation characteristics of a test sample is essentially identical to that of the bridge shown in FIG. 1. In this instance, however, the test pulse is coupled into bridge arm 101 via diode 301 and into bridge arm 102 via diode 302. This is achieved by biasing diodes 301 and 302, in well known fashion, to pass microwave energy. Once the test pulse has been supplied to arms 101 and 102, the bias supplied to diodes 301 and 302 is altered causing them to function as reflecting elements. This is achieved by supplying a signal from timing control 121 via delay 303 to diodes 31 and 302. The delay interval is adjusted to allow sufficient time for the test pulse to reach bridge arms 101 and 102. Accordingly, the test pulse is reflected and re-reflected in each arm a plurality of times.

The above-described arrangements are, of course merely illustrative of the application of the principles of this invention. Numerous other arrangements may be devised by those skilled in the art without departing from the spirit or scope of the invention. For example, in the embodiment shown in FIG. 1, waveguide sections arranged in a closed circular or oval configuration may be used for bridge arm 101 and 102. This arrangement would allow the test pulse to propagate the length of each bridge arm a plurality of times and eliminate the need for reflecting elements 110. Moreover, a single directional coupler may be employed both for supplying the test pulse to the bridge arms and for sampling the echo pulses from the bridge arms.

Additionally, numerous arrangements may be employed in the sample arm of the bridges shown in both FIGS. 1 and 3. For example, the sample arm may include an antenna and a remote reflecting element combination which facilitates determining the propagation characteristics of the atmosphere. In such an arrangement, a test pulse is radiated from the antenna to propagate through the atmosphere to the reflecting element. The reflected signal propagates through the atmosphere back to the antenna where it is received, processed and re-radiated to the reflecting elements, where the cycle is iterated.

Furthermore, the principles of this invention are equally applicable to optical measurement systems. For example, in such a system, a laser beam is supplied to the arms of a "bridge" via a prism and optical glass couplers. Each coupler is made of a "good" grade optical glass which, for example, transmits 96 percent of the energy supplied thereto while reflecting only 4 percent. This arrangement simultaneously weakly couples the light pulse into each bridge arm. Mirrors are employed to reflect the light energy, thereby causing it to propagate the length of each bridge arm a plurality of times. The reflected energy is sampled by again employing optical glass coupling elements. Detection of the sampled reflected signals is straightforward. The detected signals are compared to yield the desired difference signal, which is utilized as desired to determine the propagation characteristics of a sample under test.

What is claimed is:

1. Apparatus for measuring electromagnetic wave propagation characteristics of a test sample which comprises:
   a first transmission medium having a predetermined length;
   a second transmission medium having a predetermined length;
   means associated with said first transmission medium for accommodating a test sample;
   means for generating a pulse signal having a predetermined frequency and time interval;
   means for simultaneously supplying said pulse signal to said first and second transmission media;
   said first and second transmission media having substantially identical characteristics and each of said media being arranged so that said supplied pulse signal propagates the length of each of said media a plurality of times;
   means for sampling the pulse signals propagating in said first and second transmission media; and
   means for comparing the sampled pulse signals to generate a difference signal, said difference signal being a measure of the propagation characteristics of a sample-under-test placed in said accommodating means.

2. Apparatus as defined in claim 1 further including means associated with each of said first and second transmission media for reflecting said pulse signal so that said pulse traverses the length of each of said media a plurality of times.

3. Apparatus as defined in claim 2 wherein each of said first and second transmission media includes a waveguide section having a second end, and wherein said reflecting means includes microwave shorts terminating said first and second ends of said waveguide sections.

4. Apparatus as defined in claim 2 wherein each of said first and second transmission media includes a waveguide section having a first and second end, said reflecting means includes a microwave short at a first end of each of said waveguide sections, and said simultaneous coupling means includes a microwave switching diode in circuit with the second end of each of said waveguide sections, said microwave diodes being operative to supply said pulse signal to said waveguide sections when biased in a first predetermined mode and to reflect said supplied pulse signal when biased in a second predetermined mode.

5. A bridge circuit for measuring electromagnetic wave propagation characteristics of a test sample which comprises:
   a first waveguide section having a predetermined length;
   a second waveguide section having a predetermined length;
   means associated with said first waveguide section for accommodating a test sample;
   said first waveguide section and accommodating means and second waveguide section being adjusted to have substantially identical propagation characteristics;
   means for generating a test signal at a predetermined microwave frequency;
   gate means supplied with said test signal for generating a pulse signal having a predetermined interval, said interval being less than the time required for a pulse signal at said microwave frequency to traverse twice the length of said first waveguide section;
   means for simultaneously supplying said pulse signal to said first and second waveguide sections;
   means for sampling pulse signals propagating in each of said waveguide sections;
   means for comparing the sampled pulse signals to generate a difference signal; and
   detector means responsive to said difference signal for generating a signal which is a measure of the propagation characteristics of a test sample placed in said accommodating mean.

6. A bridge circuit as defined in claim 5 wherein each of said first and second sections has a first and second end, and further including means in circuit with each end of said waveguide sections for reflecting pulse signals propagating in each waveguide sections.

7. A bridge circuit as defined in claim 6 wherein sampling means includes a first microwave coupler in circuit with said first waveguide section and a second microwave coupler in circuit with said second waveguide section, and wherein said comparing means in a first microwave Tee in circuit relationship with said first and second microwave couplers.

8. A bridge circuit as defined in claim 7 wherein said supplying means includes a second microwave Tee supplied with said pulse signal, a third microwave coupler in circuit relationship with said second Tee and said first waveguide section, and a third microwave coupler in circuit relationship with said second Tee and said second waveguide section and wherein each of said reflecting means includes a microwave short.

9. A bridge circuit as defined in claim 5 wherein each of said first and second waveguide sections has a first and second end, and wherein said supplying means includes a microwave Tee, a first microwave switching diode in circuit relationship with said Tee and the first end of said first waveguide section, and a second microwave switching diode in circuit relationship with said Tee and the first end of said second waveguide section, said diodes being operative to supply said test pulse to said waveguide sections when biased in a first predetermined mode to reflect said supplied test pulse when biased in a second predetermined mode, and further includes a microwave short in circuit with the second end of each of said waveguide sections.

10. A method for measuring electromagnetic wave propagation characteristics of a test sample utilizing a balanced bridge circuit which includes a sample arm and a reference arm, comprising the steps of:

generating a pulse having a predetermined frequency and time interval, said interval being less than the time required for a pulse signal at said predetermined frequency to traverse twice the length of said sample arm;

simultaneously supplying said pulse signal to said sample arm and said reference arm;

sampling pulse signals propagating in each of said sample and reference arms;

comparing the sampled pulse signal to generate a difference signal;

detecting the difference signal to generate a signal which is a measure of the propagation characteristics of a test sample placed in said sample arm; and utilizing said detected signal to determine said propagation characteristics.

* * * * *